United States Patent [19]
Viaud

[11] Patent Number: 5,224,329
[45] Date of Patent: Jul. 6, 1993

[54] AUGER ARRANGEMENT FOR PREVENTING BUILD-UP OF MATERIAL ON A BELT SUPPORT ROLL OF A CONVEYOR-LIKE STRUCTURE

[75] Inventor: Jean Viaud, Sarreguemines, France
[73] Assignee: Deere & Company, Moline, Ill.
[21] Appl. No.: 868,141
[22] Filed: Apr. 14, 1992
[30] Foreign Application Priority Data
Apr. 24, 1991 [DE] Fed. Rep. of Germany ....... 4113311
[51] Int. Cl.$^5$ ............ A01D 61/02; A01F 15/07; A01F 15/18; B65G 45/20
[52] U.S. Cl. ................. 56/341; 56/DIG. 1; 100/88; 198/498
[58] Field of Search ............ 56/341, DIG. 1; 100/88; 198/494, 497, 498

[56] References Cited
U.S. PATENT DOCUMENTS
3,888,345 6/1975 Mitchell ............... 198/230
4,648,239 3/1987 Geiser et al. ........... 56/341

FOREIGN PATENT DOCUMENTS
0070537 1/1983 European Pat. Off. .
0201898 11/1986 European Pat. Off. .
923598 2/1955 Fed. Rep. of Germany .
2575362 7/1986 France .
785757 11/1957 United Kingdom .
2023525 1/1980 United Kingdom .

Primary Examiner—Stephen J. Novosad

[57] ABSTRACT

An auger arrangement is provided to prevent the build-up of material on a belt support roll of a conveyor-like structure including a plurality of rolls supporting a plurality of belts thereon in side-by-side relationship and being configured to define the baling chamber of a round baler. The auger is mounted such that its flighting passes closely adjacent the outer surface of the roll from which it is desired that adhering material be removed to prevent the build-up of such material.

7 Claims, 2 Drawing Sheets

2

AUGER ARRANGEMENT FOR PREVENTING BUILD-UP OF MATERIAL ON A BELT SUPPORT ROLL OF A CONVEYOR-LIKE STRUCTURE

BACKGROUND OF THE INVENTION

The present invention concerns an auger arrangement used in combination with a roll supporting belts of a conveyor like structure for conveying stray material away from the roll, and more specifically relates to such an arrangement used together with rolls and belts forming part of a baling chamber for preventing the build-up of material on a roll located in an enclosed area formed by the belts adjacent the baler baling chamber.

Arrangements to prevent material build-up on conveyors are known in a multiplicity of configurations and are applied where material is engaged by a moving part, is carried along and wrapped around the part, or deposits itself thereon.

For example, GB-A-2 023 525 shows a driven rotating auger and a roll between which there runs a span of a belt of a coal or stone conveyor. The underside of the belt is brought into contact with the outer edge of the flights of the auger by the roll, so that during the running of the conveyor the material adhering to the underside of the belt is removed in the radial direction of the auger.

U.S. Pat. No. 4,648,239 issued on Mar. 10, 1987 shows an arrangement to prevent material build-up in a round baler at a roll over which several belts are carried. This arrangement consists of a scraper bar, an optional helix applied to the roll, and an auger. While the material adhering to the roll is conducted by the helix in its axial direction, the scraper bar removes additional material from the roll which is conducted by the auger to an opening between the belts, where it can escape.

Finally, it is known (round balers of the firm Batlle of Spain) to have an auger scraping along one side of a belt in order to remove material adhering there and to convey it to an opening.

The aforementioned configurations have the disadvantage that they are either too costly in design or that they do not completely encompass or eliminate all the material to be removed.

SUMMARY OF THE INVENTION

According to the present invention there is provided an improved auger arrangement to prevent the build-up of material on rolls located in areas enclosed by belts that form part of the baling chamber of a round baler.

An object of the invention is to provide, in conjunction with the belts and support rolls forming a conveyor-like structure, in particular a baling chamber of a round baler, a simple, low cost, reliable arrangement for removing material from the vicinity of one of the support rolls which is susceptible to becoming wrapped with such material.

A more specific object of the invention is to provide an arrangement, as set forth in the previous object, which comprises an auger that directly removes material from a baler belt support roll.

Yet another specific object of the invention is to provide an auger having flighting shaped complimentary to and which operates in close proximity to the outer surface of a baler belt support roll so proper clearance for effective removal of material from the roll may be maintained even if the roll surface includes projections along its length to aid in belt tracking.

These and other objects will become apparent from a reading of the ensuing description together with the appended drawings.

DESCRIPTION OF THE PREFERRED EMBODIMENT

Figure 1:
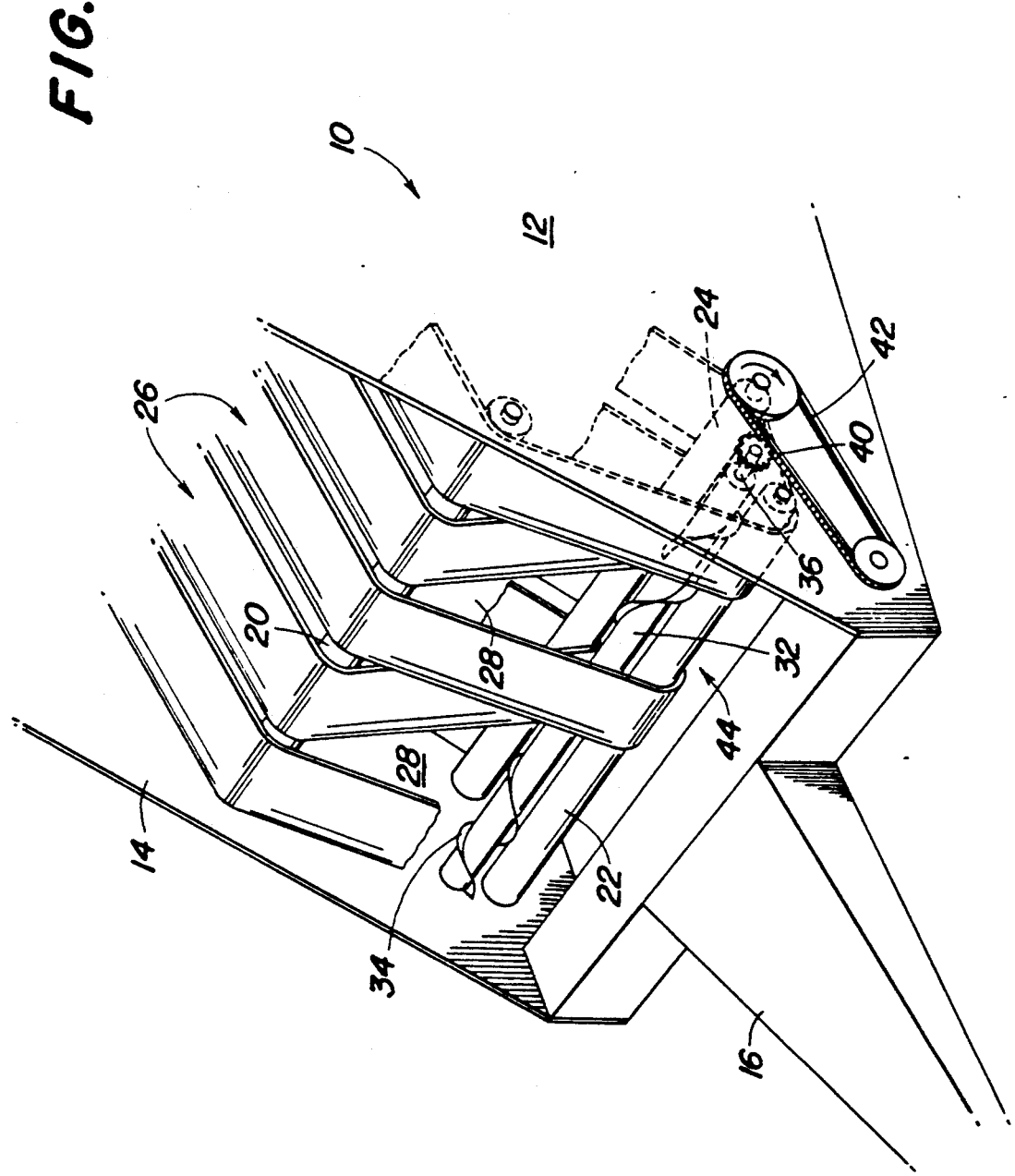
FIG. 1 shows the forward region of a conveyor-like belt and support roll configuration forming a baling chamber of a round baler in conjunction with an auger arrangement to prevent material build-up at one of the rolls in accordance with the present invention.

Referring now to FIG. 1, therein is shown a forward portion of a round baler 10 having right and left side walls 12 and 14 that are carried by a frame 16. Extending between and mounted to the side walls 12, 14 are several rolls having cylindrical bodies that are free to rotate or are driven. Specifically the rolls include upper, forward lower and rear lower rolls 20, 22 and 24, respectively.

The rolls support a multitude of belts 26 running alongside each other, configured as flat belts, which enclose between sections of their spans, a baling chamber for the compacting of crop, by means not shown, between the side walls 12, 14. Thus, the belts and rolls are somewhat like a conveyor in construction. In place of flat belts, chains, bands or the like may be provided.

It is to be understood that while the rolls and belts are here shown as forming part of the baling chamber of a round baler where crop is conveyed to a baling chamber and there applied to a cylindrical contour, the invention to be described hereinafter is applicable to conveyors including those handling loose material on a load-carrying surface that is carried over rolls. Examples are conveyor belts moving sand, coal and rock, but also baling arrangements for cotton, rags, scrap paper, lumbering scrap and the like.

As is apparent from the drawing, considering the belts 26 in the direction from the side wall 12 to the side wall 14, the set of belts comprising the first, third and fifth belts are carried over all three of the rolls 20, 22 and 24, while a second set of belts 26 comprising the second and fourth belts extend directly between the rolls 20 and 24 in bypassing relationship to the roll 22. As a result, a wedge-shaped opening 28 is created between each of the first, third and fifth belts 26 and adjacent ones of the second and fourth belts 26 and extends perpendicular to the plane of motion of the belts.

Figure 2B:
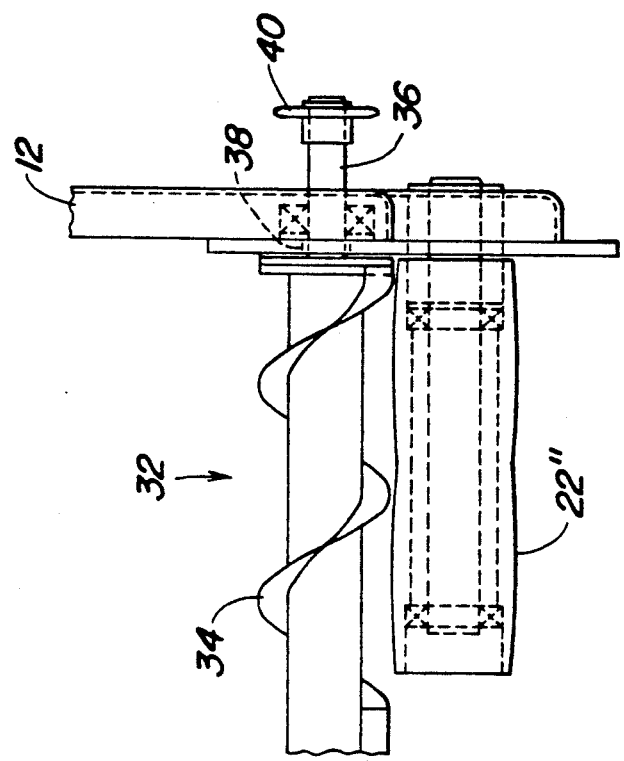
FIG 2b is a view similar to that of FIG. 2b but wherein the cantilevered short cylindrical roll has an outer surface crowned in certain sections to aid in belt guidance.
Figure 2A:
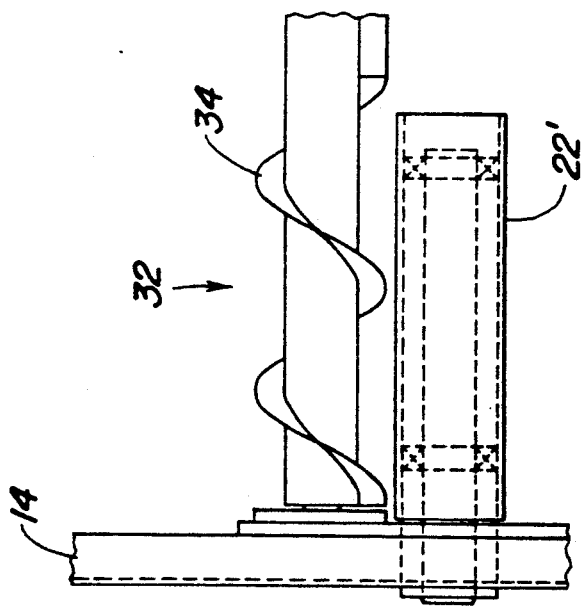
FIG. 2a is a view showing the auger arrangement of FIG. 1 together with a cantilevered short cylindrical roll having an outer surface of constant diameter, the view being taken normal to a plane containing the longitudinal axes of the auger and roll.

The single roll 22 shown in FIG. 1 may be replaced by a pair of short, cylindrical rolls 22' or 22", only one of each pair being respectively shown in FIGS. 2a and 2b, which are cantilevered from the walls 14, 12. In such a construction, again starting at the wall 12, the set of the belts 26 that would engage the pair of rolls 22' or 22" together with the rolls 20 and 24 would be first, second, fourth and fifth belts 26, with the first and second belts being engaged with one of the pair of rolls 22' or 22" and with the fourth and fifth belts being engaged with the other of the pair of rolls 22' or 22". The middle or third belt 26 would extend directly between the rolls 20 and 24 to thus form wedge-shaped openings between the third belt and the second and fourth belts. Thus, it will be appreciated that each of the pair of the pulleys 22' or 22" extends over only the width of the belts engaged therewith and thus are spaced axially apart by the width of one of the belts 26.

The roll configurations according to FIGS. 2a and 2b differ in that outer surface of the roll 22' in FIG. 2a is of a constant diameter throughout its length, while that of the roll 22" in FIG. 2b has a cylindrical contour but is provided with a pair of crowned surfaces in the areas of belt contact.

An auger arrangement 30 to prevent the build-up of material according to the invention contains an auger 32 that is shown in all figures working together with the roll 22 or the pairs of rolls 22', 22".

The auger 32, whether used with the single roll 22 or with the pair of axially spaced rolls 22' or 22", extends over the entire distance between the side walls 12, 14 and is provided over its entire length with auger flighting 34.

It is also possible to configure the auger 32 as a pair of short augers that extend, for example, only over the length of the pair of rolls 22' or 22". In addition, it is possible to extend the auger flighting 34 of the auger 32 not over the entire length of the auger extending from one side wall to the other, but to provide it only in sections required for moving material to the openings 28.

The auger 32 has an auger shaft 36 extending through an opening 38 in the right side wall 12 to the outside and is attached rigidly there to a drive gear 40. The drive gear 40 meshes with a drive chain 42, which in this case drives the auger 32, powered by a drive taken from the lower rear roll 24. Accordingly, the auger 32 is brought into motion anytime that the roll 24 is driven to move the belts 26.

Optionally, instead of having its flighting 34 arranged for delivering material to the openings 28, the auger 32 with its flighting can be extended so that it projects through the side walls 12, 14 for which appropriate openings are provided, the flighting then being arranged to deliver material in opposite directions to the outside of the walls 12, 14. Such an arrangement would particularly be useful in a baler wherein the lower forward roll was omitted in which case the openings or gaps 28 would not be present.

The auger 32 is so arranged that the outer edges of its flighting 34 are almost in contact with the surface of the forward roll 22, 22' or 22" with which it is being used. In other words, the auger 32 should be arranged such that the gap remaining between the flighting and the associated roll is as small as possible. In any case the distance between the auger flighting 34 and the roll 22, 22' or 22" should be so small that material which tends to wrap itself around the roll cannot pass between the flighting and the roll. It will be appreciated that as material such as grass, straw, hay or the like adheres to the rolls 22, 22' and 22" by whatever means and rotates with them, the material is engaged by the auger flighting 34 and conveyed along its axis of rotation in a direction determined by the pitch of the flighting.

As can be seen in FIG. 1, the auger 32 extends through the wedge shaped openings 28. Between two wedge-shaped openings 28 there is a space 44 opening downward through which the material conveyed by the auger 32 the roll can escape from the region of the belt rolls.

The direction of rotation of the auger 32 and the direction and pitch of its auger thread 34 is selected so that the material removed from the surface of the roll 22, 22' or 22" is conveyed to the spaces 44. Depending on the location of the delivery points, it is possible, or even necessary, to provide different sections of the auger flighting along the shaft 36 with various pitch directions.

If the cantilevered roll 22" is configured according to FIG. 2b, that is with crowns in the areas of belt contact, the shape of the radially outer edge of the auger flighting 34 is modified to compensate for this shape, so that during rotation of the roll 22" and the auger 32 the desired smallest possible gap is maintained between the outer edge of the auger flighting 34 and the surface of the roll 22"; in this case exact synchronization of the rotating movement of the auger 32 and the roll 22" needs to be observed.

The operation of the auger 32 is thought to be evident from the above description. Suffice it to say in summary, the auger moves material adhering to the associated roll 22, 22' or 22" and conveys it in axial direction to a respective opening 28 between variously routed sets of belts 26 or to the openings 38 in the side walls 12, 14 where it can escape.

I claim:

1. In combination with a conveyor-like structure including material moving belts supported on a plurality of rolls extending between opposite side walls, an auger arrangement for preventing the build-up of material on one of the rolls, comprising: said auger having at least one end mounted to one of the side walls and being driven and arranged parallel to the one roll and having flighting in the immediate vicinity of the roll for removing from the roll material carried along by the roll.

2. The combination defined in claim 1 wherein the one roll and the auger are driven at differing circumferential speeds.

3. The combination defined in claim 3 wherein said one roll includes crowns provided thereon in areas engaged by the belts; and the auger including flighting having an outer profile which follows the contour of the said one roll.

4. The combination defined in claim 1 wherein the auger projects through a hole in said at least one side wall and the auger flighting being pitched to deliver material removed from the roll to a zone outside of said one side wall.

5. In a round baler having several belts running parallel to each other over a plurality of belt support rolls configured to define a baling chamber and an auger arrangement including an auger extending parallel to one of the rolls, the improvement comprising: said auger having flighting located for sweeping a path closely adjacent an outer surface of the one roll whereby material adhering to the surface of the roll is removed and conveyed away by said auger.

6. The round baler defined in claim 5 wherein the belts and rolls are arranged such that one set of belts skips over a middle roll of three non-aligned rolls to thereby form an opening perpendicular to a plane of motion of the belts between the one set and the remaining set of belts; and said flighting being pitched for conveying material to each such opening.

7. The round baler defined in claim 5 wherein the auger penetrate at least one of the side walls; and said flighting being pitched for causing the material removed from said one roll to be delivered to a zone outside said one of the side walls.

* * * * *

UNITED STATES PATENT AND TRADEMARK OFFICE
CERTIFICATE OF CORRECTION

PATENT NO. : 5,224,329
DATED : 6 July 1993
INVENTOR(S) : Jean Viaud

It is certified that error appears in the above-indentified patent and that said Letters Patent is hereby corrected as shown below:

Column 4, line 39, delete "3" and insert -- 1 --.

Signed and Sealed this

Twenty-fifth Day of January, 1994

Attest:

BRUCE LEHMAN

*Attesting Officer*     *Commissioner of Patents and Trademarks*